(12) United States Patent
Pan et al.

(10) Patent No.: US 12,363,731 B2
(45) Date of Patent: Jul. 15, 2025

(54) SYSTEMS AND METHODS FOR PARAMETER ESTIMATION

(71) Applicant: ZTE CORPORATION, Guangdong (CN)

(72) Inventors: Yu Pan, Shenzhen (CN); Chuangxin Jiang, Shenzhen (CN); Shujuan Zhang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 428 days.

(21) Appl. No.: 18/107,322

(22) Filed: Feb. 8, 2023

(65) Prior Publication Data

US 2023/0239888 A1    Jul. 27, 2023

Related U.S. Application Data

(63) Continuation of application No. PCT/CN2020/123041, filed on Oct. 23, 2020.

(51) Int. Cl.
*H04W 72/23* (2023.01)
*H04L 1/00* (2006.01)
*H04W 72/1273* (2023.01)

(52) U.S. Cl.
CPC .......... *H04W 72/23* (2023.01); *H04L 1/0038* (2013.01); *H04W 72/1273* (2013.01)

(58) Field of Classification Search
CPC ........................... H04W 72/23; H04W 72/1273
USPC ....................................................... 370/329
See application file for complete search history.

(56) References Cited

U.S. PATENT DOCUMENTS

| | | | |
|---|---|---|---|
| 2019/0223164 A1 | 7/2019 | He et al. | |
| 2019/0296847 A1 | 9/2019 | Sun et al. | |
| 2019/0313321 A1 | 10/2019 | Xu et al. | |
| 2020/0221428 A1 | 7/2020 | Moon et al. | |
| 2020/0236699 A1* | 7/2020 | Nakashima | H04W 72/23 |
| 2020/0287646 A1 | 9/2020 | Sun et al. | |
| 2021/0153177 A1* | 5/2021 | Hosseini | H04W 72/23 |
| 2023/0328753 A1* | 10/2023 | Kim | H04L 5/0053 370/329 |

(Continued)

FOREIGN PATENT DOCUMENTS

| | | | | |
|---|---|---|---|---|
| WO | WO-2019/215932 A1 | 11/2019 | | |
| WO | WO-2020220976 A1 * | 11/2020 | | H04L 1/0023 |

OTHER PUBLICATIONS

Extended European Search Report for EP Appl. No. 20958275.8, dated Mar. 13, 2024 (8 pages).

(Continued)

*Primary Examiner* — Peter G Solinsky
(74) *Attorney, Agent, or Firm* — Foley & Lardner LLP

(57) ABSTRACT

Presented are systems and methods for parameter estimation. A wireless communication device may determine that a first number of PDCCH transmissions, scheduled from a wireless communication node, that are associated and are PDCCH candidates for blind detection decoding, is K, wherein K is an integer larger than 1. The wireless communication device may determine a second number of PDCCH candidates to be counted for monitoring. The wireless communication device may count the second number of PDCCH candidates for monitoring with respect to the first number of PDCCH transmissions.

14 Claims, 3 Drawing Sheets

(56) References Cited

U.S. PATENT DOCUMENTS

2023/0362892 A1* 11/2023 Khoshnevisan ...... H04L 5/0053

OTHER PUBLICATIONS

ZTE, "Enhancements on Multi-TRP and Multi-panel Transmission" 3GPP TSG RAN WG1 #99, R1-1911930, Nov. 18, 2019, Reno, USA (14 pages).
Huawei et al., "Reliability enhancement on PDCCH with multi-TRP panel in consideration of low blind detection numbers", 3GPP TSG RAN WG1 meeting #96b, R1-1905269, Apr. 12, 2019, Xi'an, China (4 pages).
Mediatek Inc., "Clarifications in BWP switch requirements", 3GPP TSG-RAN WG4 Meeting #92, R4-1908181, Aug. 30, 2019, Ljubljana, Slovenia (3 pages).
Notice of Reasons for Rejection for JP Appl. No. 2023-509500, dated Oct. 25, 2024 (with English translation, 8 pages).
International Search Report and Written Opinion for PCT Appl. No. PCT/CN2020/123041 mailed Jul. 2, 2021 (9 pages).
Qualcomm Incorporated: "Maintenance for physical downlink control channel" 3GPP TSG RAN WG1 Meeting #94; R1-1809426; Aug. 20-24, 2018; Gothenburg, Sweden (16 pages).
CATT, "PDCCH monitoring adaptation", 3GPP TSG RAN WG1 #102-e, R1-2005721, Aug. 28, 2020, e-Meeting (5 pages).
Huawei et al., "Power saving for reduced capability devices", 3GPP TSG RAN WG1 Meeting #102-e, R1-2005270, Aug. 28, 2020, E-meeting (9 pages).
Interdigital, Inc., "Reduced PDCCH monitoring for reduced capability NR devices", 3GPP TSG RAN WG1 #102-e, R1-2006539, Aug. 28, 2020, e-Meeting (3 pages).
LG Electronics, "Discussion on PDCCH monitoring for reduced capability NR devices", 3GPP TSG RAN WG1 #102-e, R1-2006307, Aug. 28, 2020, e-Meeting (5 pages).
NEC "Reduced PDCCH monitoring for Redcap NR devices", 3GPP TSG RAN WG1 #102-e, R1-2005778, Aug. 28, 2020, e-Meeting (5 pages).
Notice of Reasons for Rejection for JP Appl. No. 2023-509500, dated Apr. 16, 2024 (with English translation, 10 pages).
Vivo, "Discussion on PDCCH repetition for URLLC", 3GPP TSG RAN WG1 Meeting #92bis, R1-1803847, Apr. 20, 2018, Sanya, China (7 pages).
ZTE, "Consideration on reduced PDCCH monitoring", 3GPP TSG RAN WG1 Meeting #102, R1-2005475, Aug. 28, 2020, e-Meeting (11 pages).
Apple Inc., "On Multi-TRP Reliability Enhancement", 3GPP TSG-RAN WG1 Meeting #103-e, R1-2008439, Nov. 13, 2020, e-Meeting (10 pages).
CATT: "Discussion on enhancements on multi-TRP/panel for PDCCH, PUCCH and PUSCH" 3GPP TSG RAN WG1 Meeting #103-e; R1-2007825; Nov. 13, 2020; e-Meeting (15 pages).
Convida Wireless, "Multi-TRP Enhancements for PDCCH, PUCCH and PUSCH", 3GPP TSG-RAN WG1#103-e, R1-2009159, Nov. 13, 2020, e-Meeting (6 pages).
Ericsson, "On PDCCH, PUCCH and PUSCH enhancements with multiple TRPs", 3GPP TSG-RAN WG1 Meeting #103, R1-2009223, Nov. 13, 2020, e-Meeting (28 pages).
Ericsson, "Remaining Issue of PDCCH Enhancements for NR URLLC", 3GPP TSG-RAN WG1 Meeting #101, R1-2003439, Jun. 5, 2020, e-Meeting (26 pages).
Fraunhofer Iis et al., "On multi-TRP enhancements for PDCCH and PUSCH", 3GPP TSG RAN WG1 Meeting #103-e, R1-2008898, Nov. 13, 2020, e-Meeting (9 pages).
Intel Corporation, "Multi-TRP enhancements for PDCCH, PUCCH and PUSCH", 3GPP TSG RAN WG1 #103-e, R1-2008978, Nov. 13, 2020, e-Meeting (17 pages).
LG Electronics, "Enhancements on Multi-TRP for PDCCH, PUCCH and PUS", 3GPP TSG RAN WG1 #103-e, R1-2008574, Nov. 13, 2020, e-Meeting (7 pages).
Mediatek Inc., "Enhancements on Multi-TRP for PDCCH, PUSCH and PUCCH", 3GPP TSG RAN WG1 #103-e, R1-2008958, Nov. 13, 2020, e-Meeting (14 pages).
NTT Docomo, Inc., "Discussion on MTRP for reliability" 3GPP TSG RAN WG1 #103-e, R1-2009175, Nov. 13, 2020, e-Meeting (11 pages).
OPPO, "Enhancements on multi-TRP for PDCCH, PUCCH and PUSCH", 3GPP TSG RAN WG1 #103-e, R1-2008218, Nov. 13, 2020, e-Meeting (9 pages).
Qualcomm Incorporated, "Enhancements on Multi-TRP for PDCCH, PUCCH and PUSCH", 3GPP TSG-RAN WG1 Meeting #103-e, R1-2009251, Nov. 13, 2020, e-Meeting (33 pages).
Samsung, "Enhancements on Multi-TRP for PDCCH, PUCCH and PUSCH", 3GPP TSG RAN WG1 #103-e, R1-2008149, Nov. 13, 2020, e-Meeting (11 pages).
Spreadtrum Communications, "Discussion on enhancements on Multi-TRP for PDCCH, PUCCH and PUSCH", 3GPP TSG RAN WG1 #103-e, R1-2009142, Nov. 13, 2020, e-Meeting (13 pages).
Vivo: "Further discussion on enhancement of MTRP operation" 3GPP TSG RAN WG1 #103-e; R1-2007645; Nov. 13, 2020; e-Meeting (15 pages).
Xiaomi, "Enhancements on Multi-TRP for PDCCH, PUCCH and PUSCH", 3GPP TSG RAN WG1 #103-e, R1-2009028, Nov. 13, 2020, e-Meeting (18 pages).
ZTE: "Multi-TRP enhancements for PDCCH, PUCCH and PUSCH" 3GPP TSG RAN WG1 Meeting #103-e; R1-2007764; Nov. 13, 2020; e-Meeting (22 pages).

* cited by examiner

SYSTEMS AND METHODS FOR PARAMETER ESTIMATION

CROSS-REFERENCE TO RELATED APPLICATION

This application claims the benefit of priority under 35 U.S.C. § 120 as a continuation of International Patent Application No. PCT/CN2020/123041, filed on Oct. 23, 2020, the disclosure of which is incorporated herein by reference in its entirety.

TECHNICAL FIELD

The disclosure relates generally to wireless communications, including but not limited to systems and methods for parameter estimation.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may determine that a first number of PDCCH transmissions, scheduled from a wireless communication node, that are associated and are PDCCH candidates for blind detection decoding, is K, wherein K is an integer larger than 1. The wireless communication device may determine a second number of PDCCH candidates to be counted for monitoring. The wireless communication device may count the second number of PDCCH candidates for monitoring with respect to the first number of PDCCH transmissions.

In some embodiments, the second number may be 1. In some embodiments, the wireless communication device may perform a single blind detection decoding on the first number of PDCCH transmissions. In some embodiments, the wireless communication device may perform the single blind detection decoding by combining received data from the first number of PDCCH transmissions. In some embodiments, the wireless communication device may perform the single blind detection decoding by performing blind detection decoding on the combined received data. In some embodiments, the second number may be K. In some embodiments, the wireless communication device may perform K blind detection decodings each on received data of a respective one of the first number of PDCCH transmissions.

In some embodiments, the second number may be (K+1). In some embodiments, the wireless communication device may perform (K+1) blind detection decodings on the first number of PDCCH transmissions. In some embodiments, the wireless communication device may perform the (K+1) blind detection decodings by performing K blind detection decodings, each on received data of a respective one of the first number of PDCCH transmissions. In some embodiments, the wireless communication device may perform the (K+1) blind detection decodings by combining received data from the first number of PDCCH transmissions. In some embodiments, the wireless communication device may perform the (K+1) blind detection decodings by performing one blind detection decoding on the combined received data. In some embodiments, the wireless communication device may perform channel estimation on each of the first number of PDCCH transmissions separately.

In some embodiments, the wireless communication device may send a capability of the wireless communication device to support a third number of PDCCH candidates to be counted for monitoring, in association with the first number of PDCCH transmissions to the wireless communication node. In some embodiments, the third number may be an integer between 1 and (K+1). In some embodiments, the third number may represent a number of PDCCH candidates to be counted for monitoring with respect to the K associated PDCCH candidates for blind detection decoding. In some embodiments, the wireless communication device may receive an indication of the second number from the wireless communication node. In some embodiments, the wireless communication device may receive the indication via radio resource control (RRC) signaling from the wireless communication node.

In some embodiments, the wireless communication device may determine an overbooking scenario. In some embodiments, the overbooking scenario may comprise at least one of: the first number of PDCCH candidate transmissions that are non-overlapped in a search space (SS) set exceeding a predefined maximum number, X, of PDCCH candidate transmissions for blind detection decoding, or a number of non-overlapped channel control elements (CCEs) in the SS set exceeding a predefined maximum number, Y, of non-overlapped CCEs. In some embodiments, the wireless communication device may determine, responsive to the overbooking scenario, to skip blind detection decoding on each associated PDCCH candidate transmission received after X or Y is met. In some embodiments, the wireless communication device may determine, responsive to the overbooking scenario, to skip blind detection decoding on each associated PDCCH candidate transmission that have a higher index than an index of a PDCCH candidate transmission received when X or Y is met.

In some embodiments, the wireless communication device may determine one or more channel control element (CCE) indices of one or more subsequent associated PDCCH candidate transmissions based on a CCE index of a first PDCCH candidate transmission. In some embodiments, the wireless communication device may obtain a value of $n_{s,f}^\mu$ or $Y_{p,n_{s,f}}^\mu$ to determine the CCE index of the first PDCCH candidate transmission, with a fixed aggregation level, L, in one SS set. In some embodiments, the one or more subsequent associated PDCCH candidate transmissions may have a value of $n_{s,f}^\mu$ or $Y_{p,n_{s,f}}^\mu$ that is same as that of the first PDCCH candidate transmission.

In some embodiments, the wireless communication device may receive a first transmission configuration indicator (TCI) state and a second TCI state. In some embodiments, the first TCI state may be indicated in downlink control information (DCI). In some embodiments, the second TCI state may be indicated or activated via radio resource control (RRC) signaling or media access control control element (MAC-CE) signaling. In some embodiments, the wireless communication device may send the first TCI state and the second TCI state to the wireless communication node, wherein the first TCI state is same as the second TCI state. In some embodiments, the wireless communication device may use a default beam indication from a medium access control control element (MAC CE) signaling. In some embodiments, the wireless communication device may use the default beam indication from the MAC CE signaling if the wireless communication device receives multiple PDCCH transmissions for indicating a physical downlink shared channel (PDSCH) transmission. In some embodiments, the wireless communication device may use the default beam indication from the MAC CE signaling if an offset between at least one of the multiple PDCCH transmissions and a scheduled PDSCH transmission is equal to or more than a threshold and an offset between at least another of the multiple PDCCH transmissions and the scheduled PDSCH transmission is less than the threshold.

At least one aspect is directed to a system, method, apparatus, or a computer-readable medium. A wireless communication node may schedule a first number of physical downlink control channel (PDCCH) transmissions that are associated and are PDCCH candidates for blind detection decoding by a wireless communication device. The wireless communication device may determine that the first number of PDCCH transmissions is K which is an integer larger than 1. The wireless communication device may determine a second number of PDCCH candidates to be counted for monitoring. The wireless communication device may count the second number of PDCCH candidates for monitoring with respect to the first number of PDCCH transmissions.

In some embodiments, the second number may be 1. In some embodiments, the wireless communication device may be caused to perform a single blind detection decoding on the first number of PDCCH transmissions. In some embodiments, the wireless communication device may be caused to perform the single blind detection decoding by combining received data from the first number of PDCCH transmissions. In some embodiments, the wireless communication device may be caused to perform the single blind detection decoding by performing blind detection decoding on the combined received data. In some embodiments, the second number may be K. In some embodiments, the wireless communication device may be caused to perform K blind detection decodings each on received data of a respective one of the first number of PDCCH transmissions.

In some embodiments, the second number may be (K+1). In some embodiments, the wireless communication device may be caused to perform (K+1) blind detection decodings on the first number of PDCCH transmissions. In some embodiments, the wireless communication device may be caused to perform the (K+1) blind detection decodings by performing K blind detection decodings, each on received data of a respective one of the first number of PDCCH transmissions. In some embodiments, the wireless communication device may be caused to perform the (K+1) blind detection decodings by combining received data from the first number of PDCCH transmissions. In some embodiments, the wireless communication device may be caused to perform the (K+1) blind detection decodings by performing one blind detection decoding on the combined received data. In some embodiments, the wireless communication node may perform channel estimation on each of the first number of PDCCH transmissions separately.

In some embodiments, the wireless communication node may receive a capability of the wireless communication device to support a third number of PDCCH candidates to be counted for monitoring, in association with the first number of PDCCH transmissions from the wireless communication node. In some embodiments, the third number may be an integer between 1 and (K+1). In some embodiments, the third number may represent a number of PDCCH candidates to be counted for monitoring with respect to the K associated PDCCH candidates for blind detection decoding. In some embodiments, the wireless communication node may send an indication of the second number to the wireless communication device. In some embodiments, the wireless communication node may send the indication via radio resource control (RRC) signaling to the wireless communication device.

In some embodiments, the wireless communication device may be caused to determine an overbooking scenario. In some embodiments, the overbooking scenario may comprise at least one of: the first number of PDCCH candidate transmissions that are non-overlapped in a search space (SS) set exceeding a predefined maximum number, X, of PDCCH candidate transmissions for blind detection decoding, or a number of non-overlapped channel control elements (CCEs) in the SS set exceeding a predefined maximum number, Y, of non-overlapped CCEs. In some embodiments, the wireless communication device may be caused to determine, responsive to the overbooking scenario, to skip blind detection decoding on each associated PDCCH candidate transmission received after X or Y is met. In some embodiments, the wireless communication device may be caused to determine, responsive to the overbooking scenario, to skip blind detection decoding on each associated PDCCH candidate transmission that have a higher index than an index of a PDCCH candidate transmission received when X or Y is met.

In some embodiments, the wireless communication device may be caused to determine one or more channel control element (CCE) indices of one or more subsequent associated PDCCH candidate transmissions based on a CCE index of a first PDCCH candidate transmission. In some embodiments, the wireless communication device may be caused to obtain a value of $n_{s,f}^\mu$ or $Y_{p,n_{s,f}}^\mu$ to determine the CCE index of the first PDCCH candidate transmission, with a fixed aggregation level, L, in one SS set. In some embodiments, the one or more subsequent associated PDCCH candidate transmissions may have a value of $n_{s,f}^\mu$ or $Y_{p,n_{s,f}}^\mu$ that is same as that of the first PDCCH candidate transmission.

In some embodiments, the wireless communication device may be caused to receive a first transmission configuration indicator (TCI) state and a second TCI state. In some embodiments, the first TCI state may be indicated in downlink control information (DCI). In some embodiments, the second TCI state may be indicated or activated via radio resource control (RRC) signaling or media access control control element (MAC-CE) signaling. In some embodiments, the wireless communication node may receive the first TCI state and the second TCI state from the wireless communication device, wherein the first TCI state is same as the second TCI state. In some embodiments, the wireless communication device may be caused to use a default beam indication from a medium access control control element (MAC CE) signaling. In some embodiments, the wireless communication device may be caused to use the default beam indication from the MAC CE signaling if the wireless communication device receives multiple PDCCH transmissions for indicating a physical downlink shared channel (PDSCH) transmission. In some embodiments, the wireless communication device may be caused to use the default beam indication from the MAC CE signaling if an offset between at least one of the multiple PDCCH transmissions and a scheduled PDSCH transmission is equal to or more than a threshold and an offset between at least another of the multiple PDCCH transmissions and the scheduled PDSCH transmission is less than the threshold.

In some embodiments, K (or other numbers/values of) PDCCH candidate transmissions may be associated/related/linked, e.g., for indicating/scheduling/triggering an uplink or downlink transmission. If the K PDCCH candidate transmissions are associated, the wireless communication device may count/determine a number of monitored PDCCH candidate transmissions with respect to the K PDCCH candidate transmissions. The wireless communication device may count the number of monitored PDCCH candidate transmissions as 1, K, K+1, or other values. In some embodiments, the wireless communication device may report/specify/send/provide a capability of the wireless communication device. The capability may correspond to a capability to support a number of PDCCH candidates to be counted for monitoring (e.g., with respect to the K associated PDCCH candidates).

In some embodiments, the wireless communication device may be unable to monitor one or more associated larger indexed overbooking PDCCH candidates. In some embodiments, the wireless communication device may be unable to monitor one or more associated overbooking PDCCH candidates. The associated overbooking PDCCH candidate(s) may be received/obtained later in time. In some embodiments, a later received PDCCH candidate on a later associated monitoring occasion (MO) may have a same/corresponding value of $n_{s,f}^{\mu}$ and/or $Y_{p,n_{s,f}^{\mu}}$ as a first received PDCCH candidate on a first associated MO.

In some embodiments, the wireless communication device may receive/obtain one or more PDCCH repetitive/candidate transmissions for indicating a PDSCH transmission for instance. If the wireless communication device receives the PDCCH repetitive transmissions, the wireless communication node may receive/obtain one or more beam indications of a DCI that are same as a default beam indication. If the wireless communication device receives the PDCCH repetitive transmissions, a first offset is equal to or more than a threshold, and/or a second offset is less than the threshold, the wireless communication device may use a default beam to receive/obtain the PDSCH. The first offset may correspond to an offset between at least one of the multiple PDCCH transmissions and a scheduled PDSCH transmission. The second offset may correspond to an offset between at least another of the multiple PDCCH transmissions and the scheduled PDSCH transmission. The threshold may include or correspond to a threshold indicated by timeDurationForQCL and/or other thresholds.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1 Mobile Communication Technology and Environment

Figure 1:
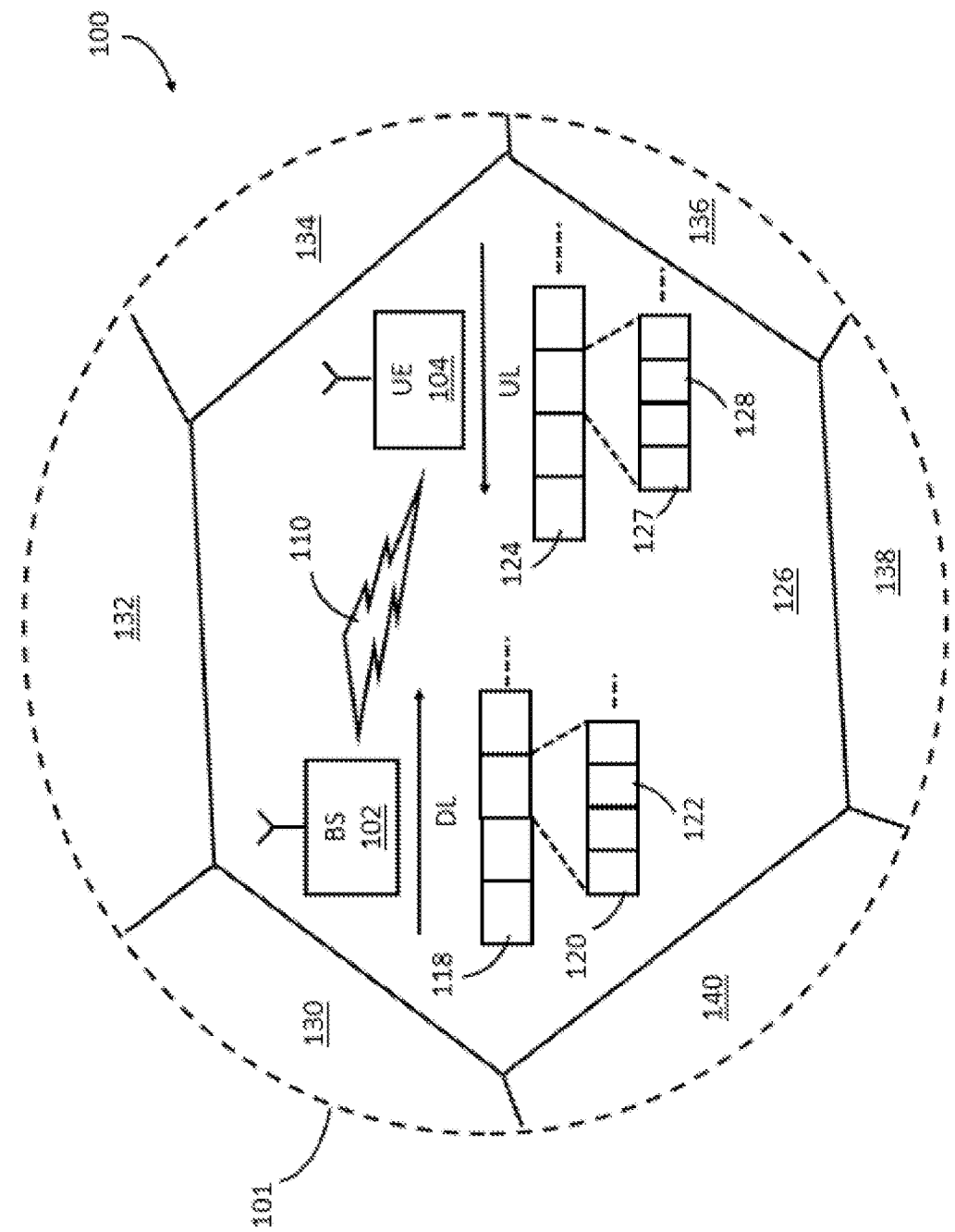
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
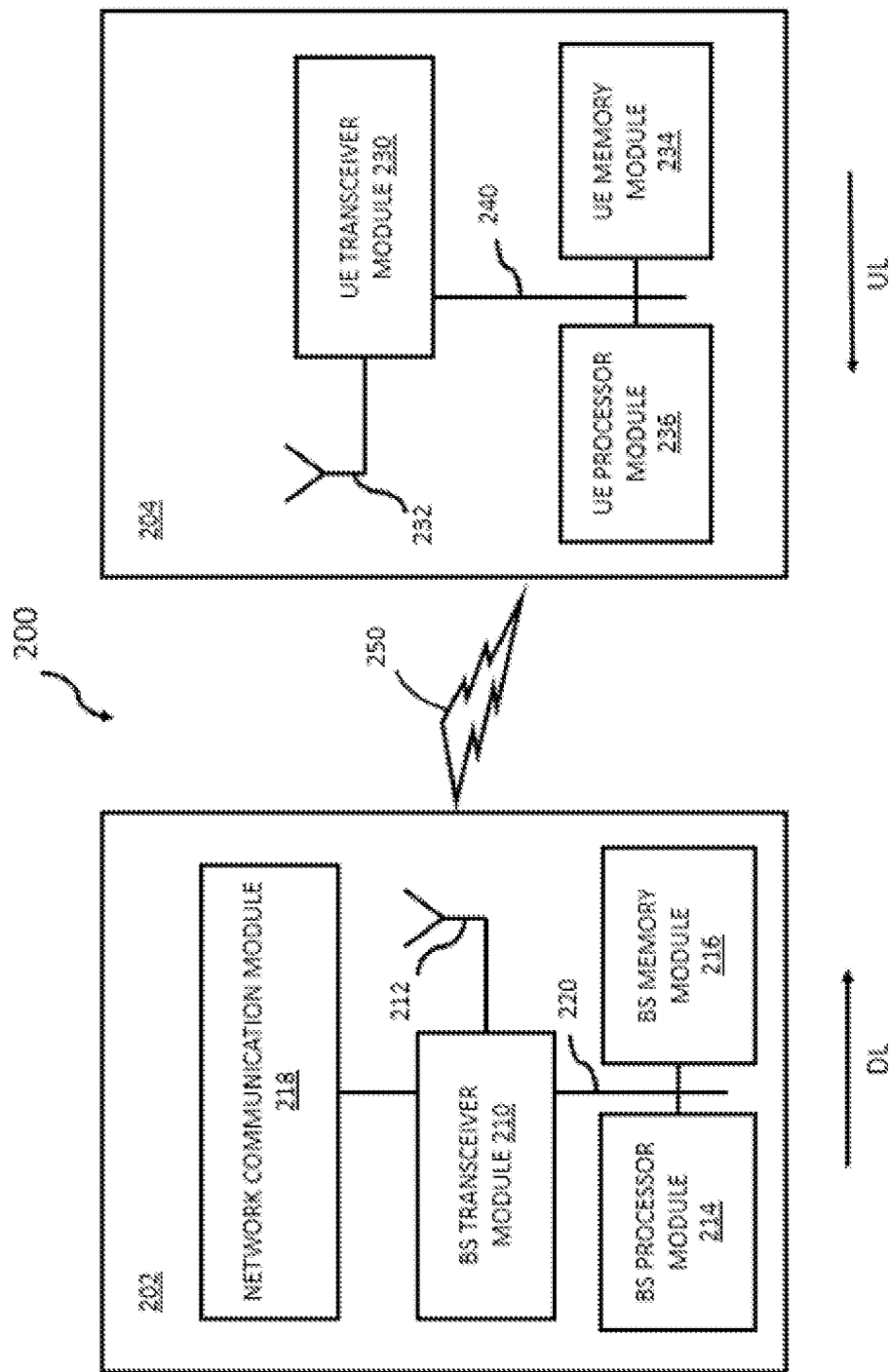
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include a non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Parameter Estimation

Certain systems (e.g., wireless communication systems and/or other systems) may include/use/enable/implement one or more procedures for joint/coupled transmissions and/or receptions of multiple transmission and reception points (multi-TRPs). In some embodiments, using multi-TRP may increase/enhance the throughput of wireless communications. Therefore, certain systems (e.g., long term evolution-advanced (LTE-A), new radio access technology (NR), and/or other systems) may support multi-TRP transmissions (e.g., to increase the throughput of wireless communications). Repeat transmissions of a multi-TRP system can efficiently enhance/improve the reliability/robustness of ultra-reliable low-latency communications (URLLC) and/or other processes. In some embodiments, certain systems with a multi-TRP setup may perform/enable/execute one or more repetitive transmissions of a physical downlink control channel (PDCCH). However, executing/performing one or more repetitive transmissions of a PDCCH (or other channels) can introduce one or more associated challenges/issues requiring one or more solutions. For example, a wireless communication device (e.g., a UE, a terminal, and/or a served node) may have to determine a number/amount of PDCCH blind detections and/or one or more priority rules for overbooking. In some embodiments, the wireless communication device may have to determine/implement one or more rules to determine at least one default beam of a physical downlink shared channel (PDSCH) transmission.

A. Embodiment 1

In some embodiments, a first number of PDCCH transmissions may be associated/related. The wireless communication device may determine that the first number of PDCCH transmissions corresponds to K, wherein K is an integer larger than 1 (or other values). A wireless communication node (e.g., a ground terminal, a base station, a gNB, an eNB, or a serving node) may schedule the first number of PDCCH transmissions. In some embodiments, the first number of associated PDCCH transmissions may be candidates for blind detection decoding (e.g., candidates for monitoring). The wireless communication device may determine/calculate/compute a count of a number of monitored PDCCH candidate transmissions with respect to the first number of PDCCH candidate/prospective transmissions. The wireless communication device may determine that the count of the number of monitored PDCCH candidates for blind detection decoding (e.g., with respect to the first number of PDCCH candidate/prospective transmissions) includes or corresponds to 1 (or other values). Therefore, the wireless communication device may perform/execute a single (or one) blind detection decoding on the first number of PDCCH transmissions (e.g., a K number of associated PDCCH candidates for blind detection decoding).

The wireless communication device may receive/obtain one or more associated/related downlink control information (DCI) via the associated PDCCH candidate transmissions. Responsive to receiving the DCI, the wireless communication device may combine/add/aggregate received data from the first number of PDCCH transmissions. Specifically, the first number of associated PDCCH candidates may be used to perform channel estimation on each of the first number of associated PDCCH transmissions separately/individually. Responsive to or independent of performing the channel estimation, the wireless communication device may combine/integrate/incorporate/add the received data and/or perform blind detection decoding once (e.g., on the combined received data).

B. Embodiment 2

In some embodiments, a first number of associated PDCCH transmissions may be candidates for blind detection decoding. The wireless communication device may determine that the first number of associated PDCCH candidates corresponds to K (e.g., K can have a value larger than 1). Therefore, K PDCCH candidate transmissions may be associated/related (e.g., the K PDCCH candidate transmissions may trigger/cause a same uplink/downlink transmission and/or the DCIs of the K PDCCH candidate transmissions have the same payload). The wireless communication device may determine/calculate/compute a count of a number of monitored PDCCH candidate transmissions with respect to the first number of associated PDCCH candidate transmissions. The wireless communication device may determine that the count of the number of monitored PDCCH candidates for blind detection decoding (e.g., with respect to the first number of associated PDCCH candidate transmissions) includes or corresponds to K (or other values). Therefore, the wireless communication device may perform/execute K blind detection decodings each on received data. The received data may correspond/refer to a received data of a respective PDCCH candidate transmission of the first number of associated PDCCH candidate transmissions. Specifically, the first number of (e.g., K) associated PDCCH candidates may be used to perform/execute channel estimation on each of the first number of associated PDCCH transmissions separately/individually. Responsive to or independent of performing the channel estimation, the wireless communication device may perform K (or other values) blind detection decodings each on the received data of the respective/corresponding PDCCH candidate transmission.

C. Embodiment 3

In some embodiments, a first number of associated PDCCH transmissions may be candidates for blind detection decoding. The wireless communication device may determine that the first number of associated PDCCH candidates corresponds to K. Therefore, K PDCCH candidate transmissions may be associated/related. The wireless communication device may determine/compute/calculate a count of a number of blind detections with respect to the first number of associated PDCCH candidate transmissions. The wireless communication device may determine that the count of the number of blind detections (e.g., with respect to the first number of associated PDCCH candidate transmissions) includes or corresponds to (K+1) (or other values). Therefore, the wireless communication device may perform/execute (K+1) blind detection decodings on the first number of associated PDCCH candidate transmissions.

The wireless communication device may receive/obtain the DCI(s) of the associated PDCCH candidate transmissions. Responsive to receiving the DCI(s), the wireless communication device may combine/add/integrate/incorporate/aggregate received data (e.g., demodulated date) from the first number of associated PDCCH candidate transmissions. Specifically, the first number of associated PDCCH candidates may be used to perform/execute separate/individual channel estimations on each of the first number of associated PDCCH transmissions. Responsive to or independent of performing the channel estimation, the wireless communication device may perform K (or other values of) blind detection decodings, each on received data. The received data may include or correspond to received data (e.g., demodulated data) of a respective PDCCH candidate transmission. Responsive to (or prior to, or in parallel with) performing the K blind detection decodings, the wireless communication device may combine/add the received data (e.g., received data of the first number of associated PDCCH candidate transmissions). Once the wireless communication device combines the received data, the wireless communication device may perform an additional (one, or at least one) blind detection decoding on the combined received data. Hence, the total count of blind detection decodings may be (K+1).

D. Embodiment 4

In some embodiments, the wireless communication device may determine/compute/count a number/amount of monitored PDCCH candidates with respect to the first number of associated PDCCH candidate transmissions. The wireless communication device may determine/count the number/amount of monitored PDCCH candidates (e.g., with respect to the first number of associated PDCCH candidates) according to signaling/configuration of the wireless communication node. For instance, the wireless communication node may configure/determine an indication of the second number (e.g., an index M and/or other indications) using radio resource control (RRC) signaling and/or other types of signaling. The wireless communication device may receive/obtain the indication(s) from the wireless communication node via RRC signaling (or other types of signaling). The indication may be an integer greater than 0 (or other values) with a value between 1 and (K+1), wherein K can indicate a first number of associated PDCCH candidate transmissions. The wireless communication device may use the indication of the second number (e.g., index M) to count the number of monitored PDCCH candidates with respect to the first number of associated PDCCH candidates. Therefore, the wireless communication device may use the indication to perform a number/amount of blind detection decodings on the first number of associated PDCCH candidate transmissions.

E. Embodiment 5

In some embodiments, the wireless communication device may report/send/indicate/provide/transmit/broadcast a capability of the wireless communication device to the wireless communication node. The wireless communication device may report/send/indicate the capability if/when a first number of associated PDCCH candidate transmissions are configured. The capability of the wireless communication device may refer/correspond to the capability (e.g., of the wireless communication device) to support a third number (e.g., a value N and/or other values) of PDCCH candidates to be counted for monitoring (e.g., number of blind detection decodings) in association/relation with the first number of PDCCH transmissions. In some embodiments, the wireless communication device may send/report the value of the third number to the wireless communication node. The third number may be an integer greater than 0 (or other values), with a value between 1 and (K+1). The third number may represent/indicate/specify a number of PDCCH transmissions per slot (or other time instances) in a downlink bandwidth part (BWP) on which the wireless communication device can perform blind detection decoding in a serving cell (e.g., with respect to the first number of associated PDCCH candidates). In some embodiments, the third number may represent/indicate/specify a number of PDCCH candidates to be counted for monitoring with respect to the first number of associated PDCCH candidate transmissions for blind detection decoding.

F. Embodiment 6

In some embodiments, the wireless communication device may determine a number of monitored PDCCH candidate transmissions with respect to the first number of associated PDCCH candidate transmissions. The number of monitored PDCCH candidate transmissions may correspond to a number of PDCCH transmissions per slot in a downlink BWP on which the wireless communication device can perform blind detection decoding in a serving cell. In some embodiments, the wireless communication device may determine/identify an overbooking scenario. The overbooking scenario may consider the first number of PDCCH candidate transmissions (e.g., PDCCH candidates for monitoring) that are non-overlapped in a search space (SS) set. For example, the overbooking scenario may comprise the first number of non-overlapped (e.g., in a SS set) PDCCH candidate transmissions exceeding/surpassing a predefined/predetermined maximum number, X, of PDCCH candidate transmissions for blind detection decoding (e.g., a maximum number of monitored PDCCH candidate transmissions). In some embodiments, the overbooking scenario may consider a number/amount of non-overlapped channel control elements (CCEs) in the SS set (e.g., a number of non-overlapped CCEs for monitoring in the SS set). For example, the overbooking scenario may comprise the number of non-overlapped CCEs exceeding a predefined/predetermined maximum number, Y, of non-overlapped CCEs.

Responsive to the overbooking scenario, the wireless communication device may determine to skip/omit blind detection decoding on certain PDCCH candidates. The wireless communication device may determine to skip/omit blind detection decoding on each associated PDCCH candidate transmission (e.g., may not monitor each associated PDCCH candidate transmission) received after X (e.g., predefined maximum number of PDCCH candidate transmissions for blind detection decoding) and/or Y (e.g., predefined maximum number of non-overlapped CCEs) is/are met. In some embodiments, the wireless communication device may determine to skip blind detection decoding on each associated PDCCH candidate transmission that has a higher/larger index than an index of a certain PDCCH candidate transmission. The certain PDCCH candidate transmission may correspond to a PDCCH candidate transmission received when X and/or Y is/are just met (but not exceeded).

G. Embodiment 7

In some embodiments, one or more monitoring occasions (MOs) in a search space (SS) set may be associated/related/linked. If one or more MOs are associated, the wireless communication device may calculate/determine/compute/configure one or more channel control element (CCE) indices of the first number of associated PDCCH candidate transmissions. In some embodiments, the wireless communication device may receive/obtain one or more subsequent/succeeding/following associated PDCCH candidate transmissions in one or more associated/related monitoring occasions (MOs). Therefore, the wireless communication device may determine/calculate/configure one or more CCE indices of the one or more subsequent associated PDCCH candidate transmissions. The wireless communication device may configure/determine the one or more CCE indices of the one or more subsequent associated PDCCH candidate transmissions using/based on a CCE index of a first PDCCH candidate transmission.

The wireless communication device may obtain/acquire/receive/attain/determine one or more values of $n_{s,f}^{\mu}$, $Y_{p,n_{s,f}^{\mu}}$, and/or other values. The wireless communication device may use the one or more values of $n_{s,f}^{\mu}$, $Y_{p,n_{s,f}^{\mu}}$, and/or other values to determine/configure a start/initial CCE index of the first PDCCH candidate transmission with/having a fixed aggregation level (L) in one SS set. In some embodiments, the one or more subsequent associated PDCCH candidate transmissions may have same/corresponding values (or other values) of $n_{s,f}^{+}$ and/or $Y_{p,n_{s,f}^{\mu}}$ as the first PDCCH candidate transmission (e.g., the first PDCCH candidate transmission of a first associated MO). For example, the values of $n_{s,f}^{\mu}$, $Y_{p,n_{s,f}^{\mu}}$, and/or other values/parameters may be used to determine/calculate the CCE index of the first PDCCH candidate transmission with the following equation/formula:

$$L \cdot \left\{ \left( Y_{p,n_{s,f}^{\mu}} + \left[ \frac{m_{s,n_{CI}} \cdot N_{CCE,p}}{L \cdot M_{s\cdot max}^{(L)}} \right] + n_{CI} \right) \bmod \left[ \frac{N_{CCE,p}}{L} \right] \right\} + i$$

Once the wireless communication device determines/calculates/configures/identifies the CCE index (e.g., using the equation), the wireless communication device may perform blind detection decoding (e.g., according to embodiments 1, 2, and/or 3) according to the determined/obtained CCE index and/or the fixed aggregation level L. In some embodiments, the wireless communication node may send/transmit/broadcast/indicate/provide the values of $n_{s,f}^{\mu}$, $Y_{p,n_{s,f}^{\mu}}$, and/or other values/parameters to the wireless communication device (e.g., via an activation with RRC signaling and/or medium access control control element (MAC-CE) signaling).

H. Embodiment 8

In some embodiments, the wireless communication device may receive/obtain one or more repetitive transmissions of a PDCCH. The PDCCH may indicate/provide/specify at least one PDSCH transmission. If the wireless communication device receives the repetitive PDCCH transmissions, the wireless communication device may receive/obtain at least one beam indication of the DCI that corresponds to (or is the same as) a default beam (state) indication. For example, the wireless communication device may receive/obtain a first transmission configuration indicator (TCI) state in the DCI. The wireless communication device may obtain/receive a second TCI state. In some embodiments, the first TCI state and the second TCI state may be the same. The wireless communication device may send/transmit/broadcast the first TCI state and/or second TCI state (e.g., that are the same as each other) to the wireless communication node.

For PDSCH transmissions, the TCI field (or other fields) of the DCI may indicate/specify/provide the at least one beam (state) indication (e.g., the first TCI state). Higher layer signaling (e.g., RRC signaling, MAC-CE signaling, and/or other types of signaling) may indicate/specify/provide/activate/enable the default beam or beam state (e.g., the second TCI state). In some embodiments, the default beam (state) can be used if tci-PresentInDCI (or other parameters) is set to "enabled". In some embodiments, the default beam (state) may be used if tci-PresentInDCI (or other parameters) is not configured with RRC connected mode (or other modes). In some embodiments, the default beam (state) may be used if an offset (e.g., a time offset, such as a slot/symbol offset, and/or other offsets) between the reception of a downlink (DL) DCI and a corresponding/associated/related PDSCH transmission is smaller/less than a threshold, such as a threshold indicated/provided/specified by timeDurationForQCL (or other parameters).

I. Embodiment 9

In some embodiments, the wireless communication device may receive/obtain one or more repetitive transmissions of a PDCCH. The PDCCH may indicate/provide/specify at least one PDSCH transmission. In some embodiments, the wireless communication device may utilize a default beam (state) indication from a MAC-CE signaling if/when one or more conditions are met/satisfied/fulfilled. The wireless communication device may use the default beam (state) indication to receive at least one PDSCH transmission. The wireless communication device may use the default beam (state) indication responsive to evaluating/determining whether one or more conditions are met/satisfied/fulfilled. The one or more conditions may include that the wireless communication device receives/obtains multiple PDCCH transmissions. The PDCCH transmissions may indicate/specify/schedule at least one PDSCH transmission. The one or more conditions may include that an offset (e.g., a time offset, such as a slot offset, and/or other offsets) between at least one of the multiple PDCCH transmissions and a scheduled PDSCH transmission (or other transmissions) is equal to or more/greater than a threshold (e.g., a threshold indicated by timeDurationForQCL and/or other thresholds), and that an offset (e.g. a time offset and/or other offsets) between at least another of the multiple PDCCH transmissions and the scheduled PDSCH transmission is less/smaller than the threshold (e.g., threshold indicated by timeDurationForQCL and/or other thresholds).

In some embodiments, the wireless communication device may assume/determine one or more ports of a demodulation reference signal (DM-RS) of a PDSCH and/or one or more PDSCH transmission occasions of a serving cell are quasi co-located with one or more reference signals (RSs) with respect to one or more quasi co-location (QCL) parameters. The QCL parameter(s) may be associated/related/linked with the TCI state(s) (e.g., the second TCI state(s) and/or other TCI states) indicated/activated by MAC-CE signaling (or other types of signaling, such as RRC signaling).

J. Methods for Parameter Estimation

Figure 3:
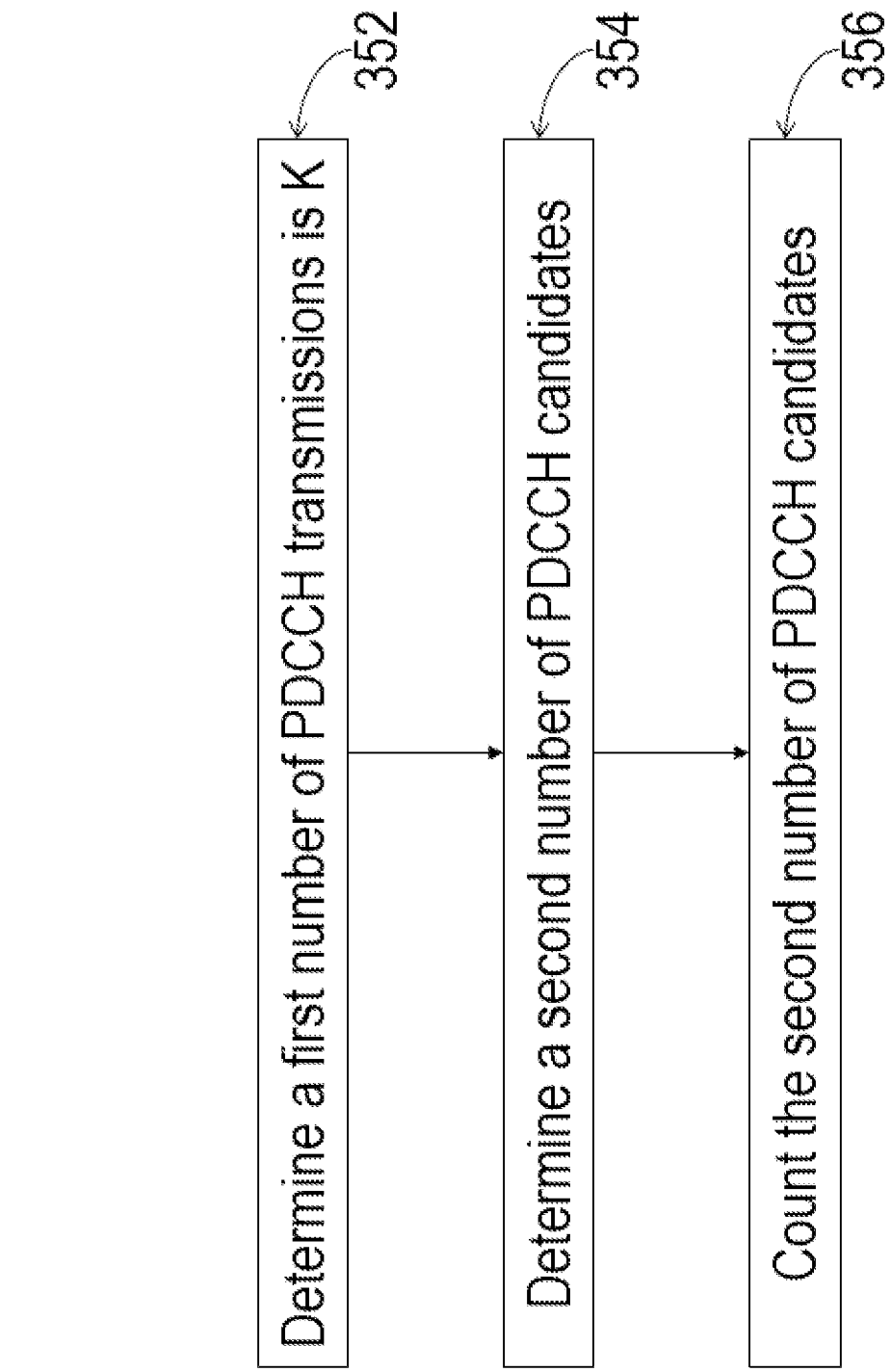
FIG. 3 illustrates a flow diagram of an example method for parameter estimation, in accordance with an embodiment of the present disclosure.

FIG. 3 illustrates a flow diagram of a method 350 for parameter estimation. The method 350 may be implemented using any of the components and devices detailed herein in conjunction with FIGS. 1-2. In overview, the method 350 may include determining that a first number of PDCCH transmissions is K (352). The method 350 may include determining a second number of PDCCH candidates (354). The method 350 may include counting the second number of PDCCH candidates (356).

Referring now to operation (352), and in some embodiments, a wireless communication device (e.g., a UE) determine that a first number of PDCCH (candidate) transmissions is K. A wireless communication node (e.g., BS) may schedule the first number of PDCCH transmissions. In some embodiments, the first number of PDCCH transmissions may be associated/related/linked (e.g., the first number of PDCCH transmissions may cause/trigger a same transmission). The first number of PDCCH transmissions may be candidates for blind detection decoding (e.g., candidates for monitoring). In some embodiments, the wireless communication device may determine and/or be caused to determine (e.g., by the wireless communication node) an overbooking scenario. The overbooking scenario may comprise the first number of PDCCH candidate transmissions that are non-overlapped in a SS set exceeding/surpassing a predefined maximum number, X, of PDCCH candidate transmissions for blind detection decoding. The overbooking scenario may comprise a number of non-overlapped CCEs in the SS set exceeding/surpassing a predefined maximum number, Y, of non-overlapped CCEs. Responsive to the overbooking scenario, the wireless communication device may determine and/or be caused to determine to skip/omit blind detection decoding (e.g., wireless communication device may skip/omit monitoring) on certain associated PDCCH candidate transmission(s). In some embodiments, the certain associated PDCCH candidate transmission(s) may be those received/obtained after X and/or Y is met/fulfilled (e.g., each associated overbooking PDCCH candidate may be received later in time). Responsive to the overbooking scenario, the wireless communication device may determine and/or be caused to determine to skip/omit blind detection decoding (e.g., wireless communication device may skip/omit monitoring) on certain associated PDCCH candidate transmission(s). The certain associated PDCCH candidate transmission(s) may be those that have a higher index than an index of a PDCCH candidate transmission received when X and/or Y is just met/fulfilled (without being exceeded).

Referring now to operation (354), and in some embodiments, the wireless communication device may determine a second number of PDCCH candidates to be counted for monitoring. In some embodiments the second number may include or correspond to a value of 1 (or other values). If the second number has a value of 1, the wireless communication device may perform/execute and/or be caused to perform (e.g., by the wireless communication node) a single blind detection decoding. The wireless communication device may perform and/or be caused to perform the single blind detection decoding on the first number of PDCCH transmissions (or other transmissions). The wireless communication device may combine/add/integrate/incorporate/aggregate received data (e.g., demodulated data) from the first number of PDCCH transmissions to perform the single blind detection decoding. The wireless communication device may perform/execute the single blind detection decoding by performing/executing blind detection decoding on the combined received/obtained/acquired/aggregated data (e.g., demodulated data) once. The wireless communication device may perform the single blind detection decoding separate from (or while) performing/executing channel estimation on each of the first number of PDCCH transmissions separately/individually. For example, responsive to or in addition to performing the separate channel estimations, the wireless communication device may combine the received data to perform the single blind detection decoding.

In some embodiments, the second number may include or correspond to a value of K (or other values). If the second number has a value of K, the wireless communication device may perform/execute and/or be caused to perform (e.g., by the wireless communication node) at least K blind detection decodings. The wireless communication device may perform the K blind detection decodings each on received/obtained data of a respective one of the first number of PDCCH transmissions. For example, the wireless communication device may count a K number of monitored PDCCH candidates with respect to the first number of PDCCH candidate transmissions. The wireless communication device may perform the K blind detection decodings by performing/executing channel estimation on each of the first number of PDCCH transmissions separately/individually.

In some embodiments, the second number may include or correspond to a value of K+1 (or other values). If the second number has a value of K+1, the wireless communication device may perform/execute and/or be caused to perform at least K+1 blind detection decodings. The wireless communication device may perform the K+1 blind detection decodings on the first number of PDCCH transmissions. The wireless communication device may perform the (K+1)

blind detection decodings by performing/executing K blind detection decodings, each on received data of a respective one of the first number of PDCCH transmissions. The wireless communication device may combine/add received data from the first number of PDCCH transmissions to perform one (or an additional) blind detection decoding, to contribute to a total count of (K+1) blind detection decodings. The wireless communication device may combine/add the received data responsive to receiving/obtaining associated DCI of the PDCCH candidates. In some embodiments, the wireless communication device may perform one blind detection decoding on the combined received data, to contribute to the total count of (K+1) blind detection decodings. The wireless communication device may perform the (K+1) blind detection decodings, in addition to (or separate from) performing/executing channel estimation on each of the first number of PDCCH transmissions separately/individually.

Referring now to operation (356), and in some embodiments, the wireless communication device may count/determine the second number of PDCCH candidates for monitoring with respect to the first number of PDCCH transmissions. In some embodiments, the wireless communication device may send/transmit/broadcast/provide/indicate a capability of the wireless communication device to the wireless communication node. The wireless communication node may receive/obtain the capability of the wireless communication device from the wireless communication device. The wireless communication device may send/provide (e.g., to a wireless communication node such as a gNB) the capability of the wireless communication device to support a third number of PDCCH candidates to be counted for monitoring. The third number of PDCCH candidates (e.g., to be counted for monitoring) may be associated/related/linked with the first number (e.g., K) of PDCCH transmissions. In some embodiments, the third number may correspond to an integer larger than 0 (or other values). The third number may include or correspond to an integer between 1 and (K+1). In some embodiments, the third number may represent/indicate/provide a number of PDCCH candidates to be counted for monitoring with respect to the K associated PDCCH candidates for blind detection decoding. In some embodiments, the wireless communication device may receive/obtain an indication of the second number (to be counted for monitoring) from the wireless communication node. The wireless communication node may provide/send/transmit the indication to the wireless communication device via higher layer signaling, such as RRC signaling, MAC-CE signaling, and/or other types of signaling. The wireless communication device may count the number of monitored PDCCH candidates with respect to the first number of PDCCH transmissions according to the indication of the second number.

In some embodiments, the wireless communication device may determine and/or be caused to determine (e.g., by the wireless communication node) one or more CCE indices of one or more subsequent/succeeding associated PDCCH candidate transmissions. The wireless communication device may determine and/or be caused to determine the one or more CCE indices based on at least one CC index of a first PDCCH candidate transmission (or other indices). The wireless communication device may obtain/acquire/receive/determine/configure a value of $n_{s,f}^{\mu}$ and/or $Y_{p,n_{s,f}}^{\mu}$. For example, the wireless communication device may obtain the value of $n_{s,f}^{\mu}$ and/or $Y_{p,n_{s,f}}^{\mu}$ via RRC signaling (or other types of signaling) from the wireless communication node. The wireless communication device may use the value of $n_{s,f}^{\mu}$ and/or $Y_{p,n_{s,f}}^{\mu}$ (or other values) to determine/calculate/con-figure the CCE index (or other indices) of the first PDCCH candidate transmission with a fixed aggregation level, L, in one SS set. In some embodiments, the one or more subsequent/succeeding associated PDCCH candidate transmissions may have a value of $n_{s,f}^{\mu}$ and/or $Y_{p,n_{s,f}}^{\mu}$ that is same as the value of $n_{s,f}^{\mu}$ and/or $Y_{p,n_{s,f}}^{\mu}$ of the first PDCCH candidate transmission.

In some embodiments, the wireless communication device may receive/obtain a first TCI state (e.g., a beam indication) and/or a second TCI state (e.g., a default beam indication). In some embodiments, DCI may include/carry/provide/indicate/specify the first TCI state (or other information). For example, the DCI may include/provide the first TCI state (e.g., one or more beam indications) to the wireless communication device. In some embodiments, RRC signaling, MAC CE signaling, and/or other types of signaling may be used to activate/enable/indicate/provide the second TCI state (or other information) to the wireless communication device. The wireless communication device may send/transmit/broadcast/provide the first TCI state and/or the second TCI state to the wireless communication node. The wireless communication node may receive/obtain the first TCI state and/or the second TCI state from the wireless communication device. In some embodiments, the first TCI state may be same as the second TCI state (e.g., the default beam indication). In some embodiments, the wireless communication device may use and/or be caused to use a default beam indication from a MAC CE signaling (or other types of signaling). The wireless communication device may use the default beam indication if/when the wireless communication device receives/obtains multiple PDCCH transmissions (e.g., one or more PDCCH repetitions) for indicating a PDSCH transmission. The wireless communication device may use the default beam indication if/when an offset between at least one of the multiple PDCCH transmissions and a scheduled PDSCH transmission is equal to or more/greater than a threshold (e.g., a threshold indicated by timeDurationForQCL). The wireless communication device may use the default beam indication if/when an offset between at least another of the multiple PDCCH transmissions and the scheduled PDSCH transmission is less/smaller than the threshold.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
   determining, by a wireless communication device, a first number of physical downlink control channel (PDCCH) candidates that are associated, wherein the first number is K which is an integer value; and
   determining, by the wireless communication device, a second number of PDCCH candidates that are associated to be counted, for monitoring with respect to the first number of PDCCH candidates that are associated.

2. The method of claim 1, wherein the second number is 1, the method comprising:
   performing, by the wireless communication device, a single blind detection decoding on the first number of PDCCH candidates that are associated, by:
   combining received data from the first number of PDCCH candidates that are associated; and
   performing blind detection decoding on the combined received data.

3. The method of claim 1, wherein the second number is K, the method comprising:
   performing, by the wireless communication device, K blind detection decodings each on received data of a respective one of the first number of PDCCH candidates that are associated.

4. The method of claim 1, wherein the second number is (K+1), the method comprising:
   performing, by the wireless communication device, (K+1) blind detection decodings on the first number of PDCCH candidates that are associated, by:
   performing K blind detection decodings, each on received data of a respective one of the first number of PDCCH candidates that are associated;

combining received data from the first number of PDCCH candidates that are associated; and performing one blind detection decoding on the combined received data.

5. The method of claim 2, comprising:

performing channel estimation on each of the first number of PDCCH candidates that are associated separately.

6. The method of claim 1, comprising:

sending, by the wireless communication device to the wireless communication node, a capability of the wireless communication device to support a third number of PDCCH candidates that are associated to be counted for monitoring, with respect to the first number of PDCCH candidates that are associated.

7. The method of claim 6, wherein the third number is an integer between 1 and (K+1), and represents a number of PDCCH candidates that are associated to be counted for monitoring with respect to the first number of PDCCH candidates that are associated.

8. The method of claim 1, comprising:

receiving, by the wireless communication device from the wireless communication node, an indication of the second number, via radio resource control (RRC) signaling.

9. The method of claim 1, comprising:

determining, by the wireless communication device, an overbooking scenario that comprises at least one of: a fourth number of PDCCH candidates that are non-overlapped in a search space (SS) set exceeding a predefined maximum number, X, or a fifth number of non-overlapped channel control elements (CCEs) in the SS set exceeding a predefined maximum number, Y; and determining, by the wireless communication device responsive to the overbooking scenario, to skip blind detection decoding on each of the fourth number of PDCCH candidates, received after X or Y is met, or to skip blind detection decoding on each of the fourth number of PDCCH candidates, that has a higher index than an index of a PDCCH candidate received when X or Y is met.

10. The method of claim 1, comprising:

receiving, by the wireless communication device, a first transmission configuration indicator (TCI) state and a second TCI state, wherein the first TCI state is indicated in downlink control information (DCI) and the second TCI state is indicated or activated via radio resource control (RRC) signaling or media access control control element (MAC-CE) signaling; and sending, by the wireless communication device to the wireless communication node, the first TCI state and the second TCI state, wherein the first TCI state is same as the second TCI state.

11. The method of claim 1, comprising:

using, by the wireless communication device, a default beam indication from a medium access control control element (MAC CE) signaling, if:

the wireless communication device receives multiple PDCCH transmissions for indicating a physical downlink shared channel (PDSCH) transmission, and an offset between at least one of the multiple PDCCH transmissions and a scheduled PDSCH transmission is equal to or more than a threshold and an offset between at least another of the multiple PDCCH transmissions and the scheduled PDSCH transmission is less than the threshold.

12. A method comprising:

scheduling, by a wireless communication node, a first number of physical downlink control channel (PDCCH) candidates that are associated, wherein the first number is K which is an integer value, wherein the wireless communication device determines a second number of PDCCH candidates for monitoring with respect to the first number of PDCCH candidates that are associated.

13. A wireless communication device, comprising:

at least one processor configured to:

determine that a first number of physical downlink control channel (PDCCH) candidates that are associated, wherein the first number is K which is an integer value;

determine a second number of PDCCH candidates to be counted, for monitoring with respect to the first number of PDCCH candidates that are associated.

14. A wireless communication node, comprising:

at least one processor configured to:

schedule a first number of physical downlink control channel (PDCCH) transmissions that are associated, wherein the first number is K which is an integer value, wherein the wireless communication device determines a second number of PDCCH candidates to be counted for monitoring with respect to the first number of PDCCH candidates that are associated.

* * * * *